(12) United States Patent
Ohata et al.

(10) Patent No.: US 7,202,585 B2
(45) Date of Patent: Apr. 10, 2007

(54) BRUSHLESS MOTOR

(75) Inventors: Katsumi Ohata, Tokyo (JP);
Masatsugu Nakano, Tokyo (JP);
Tetsunao Takaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/997,876

(22) Filed: Nov. 29, 2004

(65) Prior Publication Data

US 2006/0017343 A1    Jan. 26, 2006

(30) Foreign Application Priority Data

Jul. 22, 2004    (JP) .............................. 2004-214672

(51) Int. Cl.
*H02K 21/12*    (2006.01)
(52) U.S. Cl. ................................ 310/156.43
(58) Field of Classification Search .......... 310/156.53, 310/156.56, 156.32, 156.48, 156.01, 156.38, 310/156.57, 156.43; *H02K 1/27*
See application file for complete search history.

(56) References Cited

U.S. PATENT DOCUMENTS

| 4,417,167 A | * | 11/1983 | Ishii et al. ................. 310/67 R |
| 5,719,458 A | * | 2/1998 | Kawai .................... 310/156.49 |
| 5,783,890 A | * | 7/1998 | Mulgrave .............. 310/156.43 |
| 5,861,696 A | * | 1/1999 | Hartman et al. ....... 310/156.43 |
| 5,990,591 A | * | 11/1999 | Yamaguchi et al. ... 310/156.53 |
| 6,462,452 B2 | * | 10/2002 | Nakano et al. ........ 310/156.47 |
| 6,597,078 B2 | * | 7/2003 | Crapo et al. ........... 310/156.01 |
| 6,707,209 B2 | * | 3/2004 | Crapo et al. ........... 310/156.43 |
| 6,844,647 B2 | * | 1/2005 | Horber .................. 310/156.43 |
| 6,849,981 B2 | * | 2/2005 | Kojima et al. ......... 310/156.43 |
| 6,885,125 B2 | * | 4/2005 | Inayama et al. ............. 310/216 |
| 2002/0101126 A1 | * | 8/2002 | Crapo et al. ........... 310/156.01 |

FOREIGN PATENT DOCUMENTS

| JP | 02079738 A | 3/1990 |
| JP | 5-129127 A | 5/1993 |
| JP | 07039090 A | 2/1995 |
| JP | 1234930 | 8/1999 |
| JP | 2000-245084 A | 9/2000 |
| JP | 2002-101629 A | 5/2002 |
| JP | 2002-136001 A | 5/2002 |
| JP | 2002-262533 | * 9/2002 |
| JP | 2003-230239 A | 8/2003 |
| JP | 2003-230240 A | 8/2003 |

\* cited by examiner

*Primary Examiner*—Darren Schuberg
*Assistant Examiner*—Nguyen Hanh
(74) *Attorney, Agent, or Firm*—Sughrue Mion, PLLC

(57) ABSTRACT

A brushless motor is capable of increasing output torque while suppressing an increase in iron loss. A plurality of magnets are magnetized in reverse radial orientation in such a manner that magnetic fields directed toward a stator converge toward the stator, and each of the magnets is provided at opposite ends of its outer peripheral surface with a pair of notched portions that are cut away to gradually approach in an axial direction as they proceed from an intermediate portion to the opposite ends.

3 Claims, 7 Drawing Sheets

BRUSHLESS MOTOR

BACKGROUND OF THE INVENTION

1. Field of the Invention

The present invention relates to an inner rotor type brushless motor that is provided with a rotor having a plurality of segment type magnets disposed inside a stator so as to face the stator.

2. Description of the Related Art

As a conventional inner rotor type brushless motor, there has hitherto been known one that is provided with a rotor having segment type magnets of radial orientation (i.e., a magnetic field being directed toward the stator and diffusing toward the stator) (for example, see a patent document: Japanese PatentApplication Laid-Open No. 2003-230239)

Such a conventional brushless motor having the magnets of radial orientation involves the following problem; that is, the density of magnetic flux in a gap between the stator and the rotor is low, and the value of an induced voltage becomes accordingly low, thus providing a low output torque per current.

SUMMARY OF THE INVENTION

The present invention is intended to obviate the problem as referred to above, and has for its object to provide a brushless motor which is capable of increasing output torque while suppressing an increase in iron loss.

In a brushless motor according to the present invention, magnets are magnetized in reverse radial orientation in such a manner that magnetic fields directed toward a stator converge toward the stator, and each of the magnets is provided at opposite ends of its outer peripheral surface with a pair of notched portions that are cut away to gradually approach in an axial direction as they proceed from an intermediate portion to the opposite ends.

With the brushless motor according to the present invention, the output torque thereof can be increased while suppressing an increase in iron loss.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout the following embodiments and illustrated figures of the present invention, the same or corresponding members or parts are identified by the same symbols.

Embodiment 1

Figure 1:
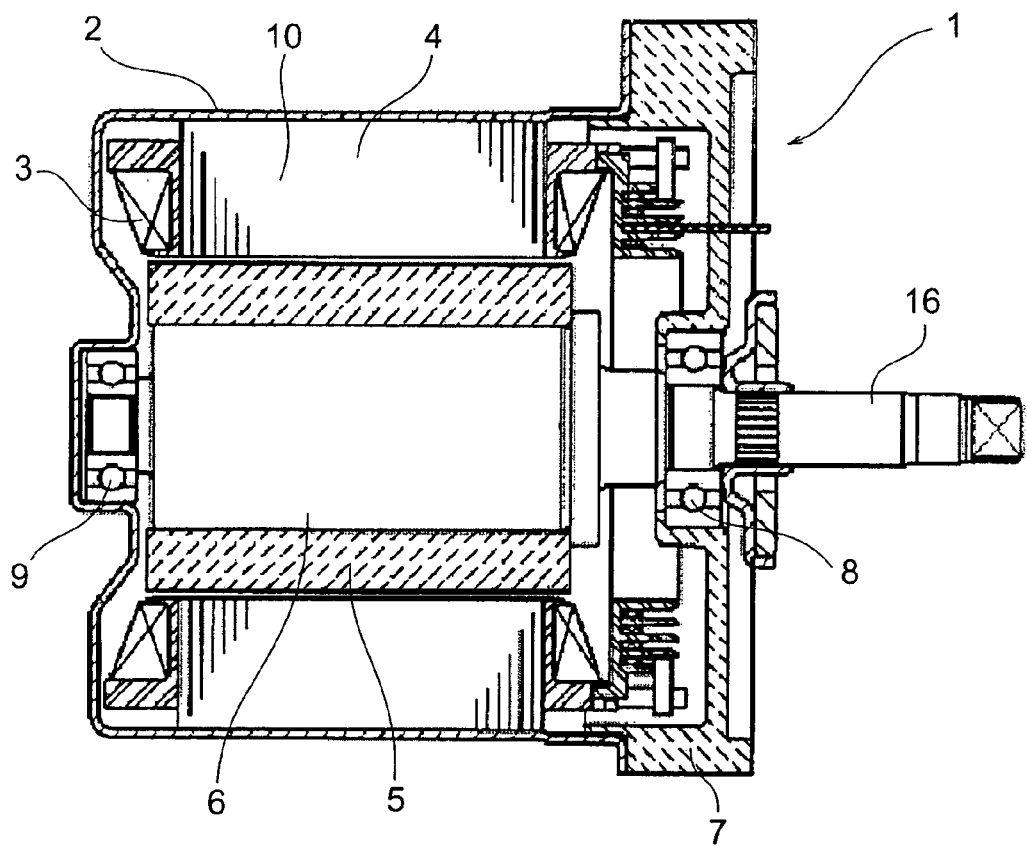
FIG. 1 is a cross sectional side view showing a brushless motor according to a first embodiment of the present invention.
Figure 2:
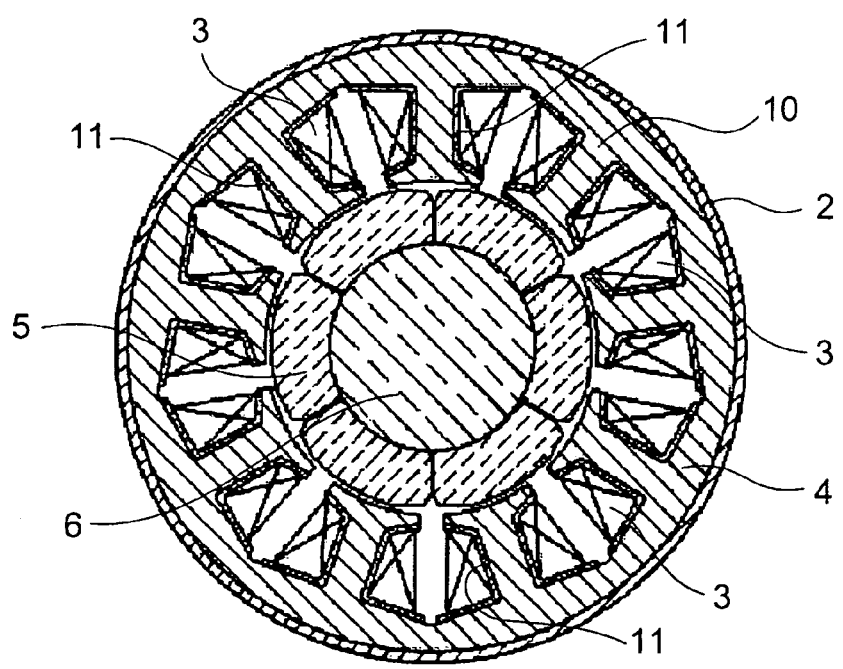
FIG. 2 is a cross sectional front view showing the brushless motor of FIG. 1.

FIG. 1 is a cross sectional side view when a brushless motor according to the first embodiment of the present invention is cut along an axial direction. FIG. 2 is a cross sectional front view when the brushless motor of FIG. 1 is cut along a diametral direction.

This brushless motor, generally designated at reference numeral 1, is comprised of a motor for an electrohydraulic power steering apparatus which is constantly driven to operate even during non-steering operation, and which is provided with a rotor 6 fixedly mounted on a shaft 16, and a stator 4 that is press-fitted into and firmly attached to a frame 2 of a bottomed cylindrical shape formed of steel sheet, and is arranged around the outer periphery of the rotor 6 with a gap formed therebetween.

The rotor 6 is rotatably supported on a housing 7 made of aluminum and the frame 2 through the shaft 16 at its opposite ends by means of a first bearing 8 attached to the housing 7 and a second bearing 9 attached to the bottom of the frame 2. In this rotor 6, segment type magnets 5 in the form of ferrite magnets are arranged so as to face the stator 4 with their N poles and S poles being arranged in an alternate manner.

Th stator 4 is provided with a core 10 formed of laminated sheet plates and having nine slots 11 which are formed at its radially inner side, extend in an axial direction and are arranged in a circumferential direction at equal intervals, and coils 3 arranged in the slots 11, respectively, and wound around radially extending core elements of the core 10, respectively.

This brushless motor 1 is used as a drive source for the electrohydraulic power steering apparatus (not shown), and when a driver operates a steering wheel of an unillustrated vehicle, the brushless motor 1 is controlled to operate in accordance with the steering angle of the steering wheel, the running speed of the vehicle, etc., so that an unillustrated hydraulic pump is driven by the brushless motor 1 to generate hydraulic pressure, which in turn serves to provide a steer assist force to an unillustrated steering system through a power cylinder.

With the brushless motor 1, the coils 3 of respective phases are supplied with currents switched in accordance with the steering angle of the steering wheel, the running speed of the vehicle, etc., so that rotating fields are generated in the stator 4, whereby the rotor 6 is driven to rotate so as follow the rotating fields.

Figure 3:
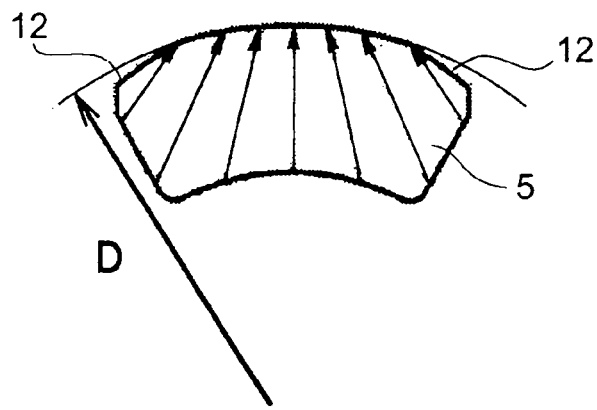
FIG. 3 is a view showing the magnetic field orientation of the magnet of FIG. 1.

FIG. 3 illustrates a magnet 5 shown in FIGS. 1 and 2, which is magnetized in reverse radial orientation in such a manner that a magnetic field extending in a direction toward the stator 4 converges toward the stator 4, and which is formed at its opposite ends with a pair of notched portions 12 that are cut away in a manner to gradually approach in the axial direction (i.e., with their radius gradually decreasing) as they proceed from an intermediate portion toward the opposite ends.

Figure 4:
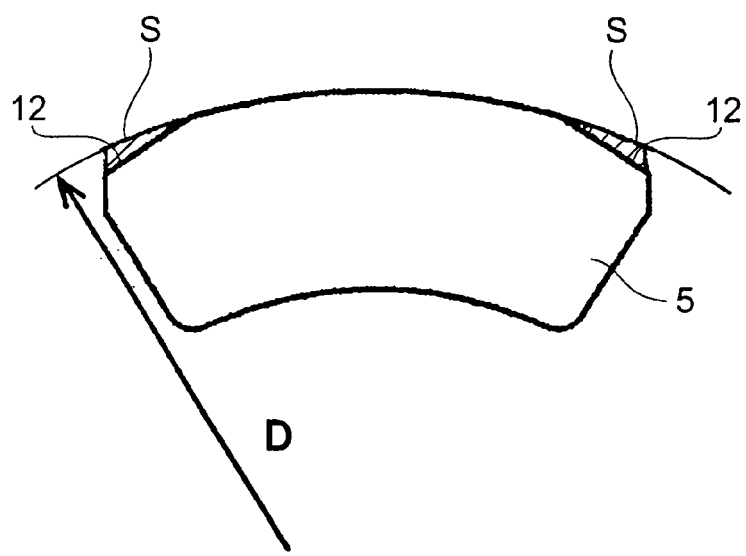
FIG. 4 is a front elevational view showing the magnet of FIG. 1.

The area S (see FIG. 4) of each of the pair of notched portions 12 is generally expressed as $S=(D^2/P)\times\alpha$, where D is the diametral dimension of the outer peripheral axially-intermediate portion of each magnet 5; P is the number of pole pairs; and a is a shape factor. In this case, the number of slots is 9; P is 3; and the shape factor $\alpha$ at that time is a value that is in the range of $0<\alpha\leqq 0.012$.

For example, the configuration of each notched portion 12 is cut away in a linear shape, but it may be cut away in a circular arc shape.

Figure 5:
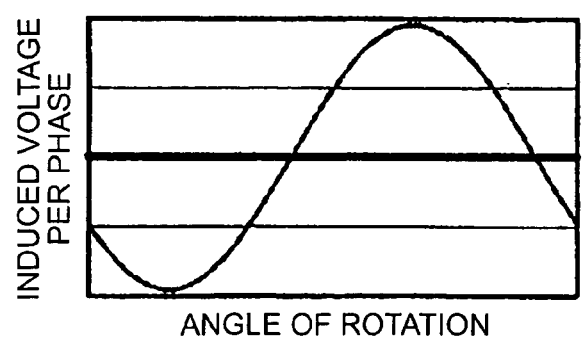
FIG. 5 is a characteristic view showing the relation between the angle of rotation of a rotor and an induced voltage per phase.

The inventor obtained through experiments a characteristic view that shows the relation between the angle of rotation of the rotor 6 and the induced voltage per phase in the brushless motor of this first embodiment. FIG. 5 is the characteristic view obtained at that time.

Figure 6:
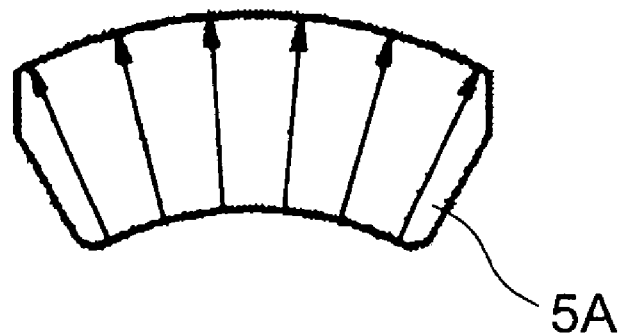
FIG. 6 is a front elevational view showing a magnet of radial orientation.
Figure 7:
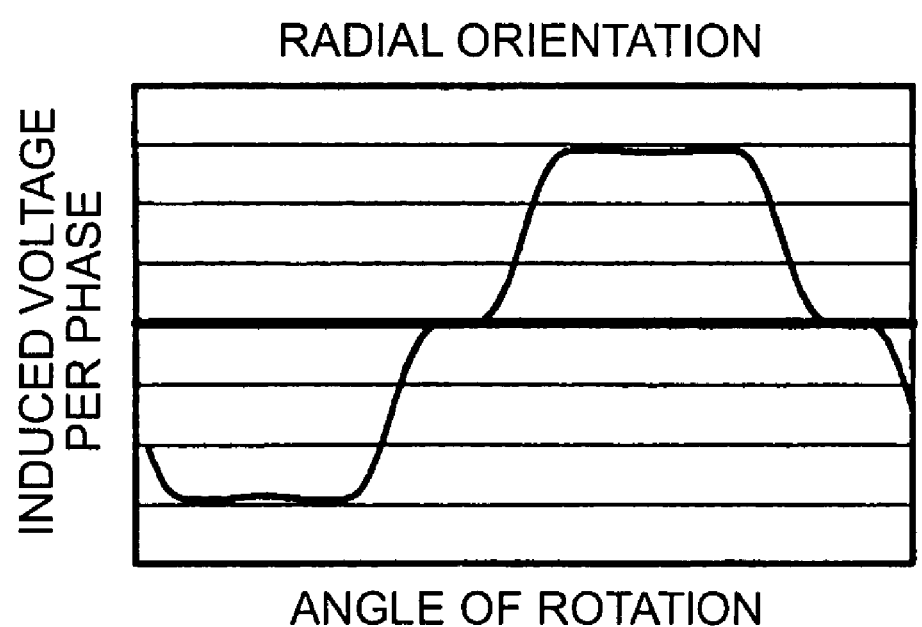
FIG. 7 is a characteristic view showing the relation between the angle of rotation of a rotor and an induced voltage per phase in the magnet of FIG. 6.

Also, the inventor obtained through experiments a characteristic view of a brushless motor using a magnet 5A of radial orientation as a comparison example, as shown in FIG. 6. FIG. 7 is the characteristic view obtained at that time.

Figure 8:
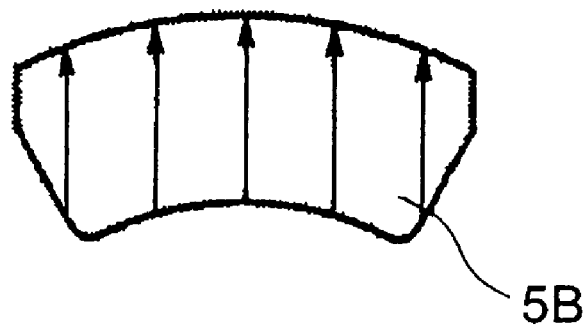
FIG. 8 is a front elevational view showing a magnet of parallel orientation.
Figure 9:
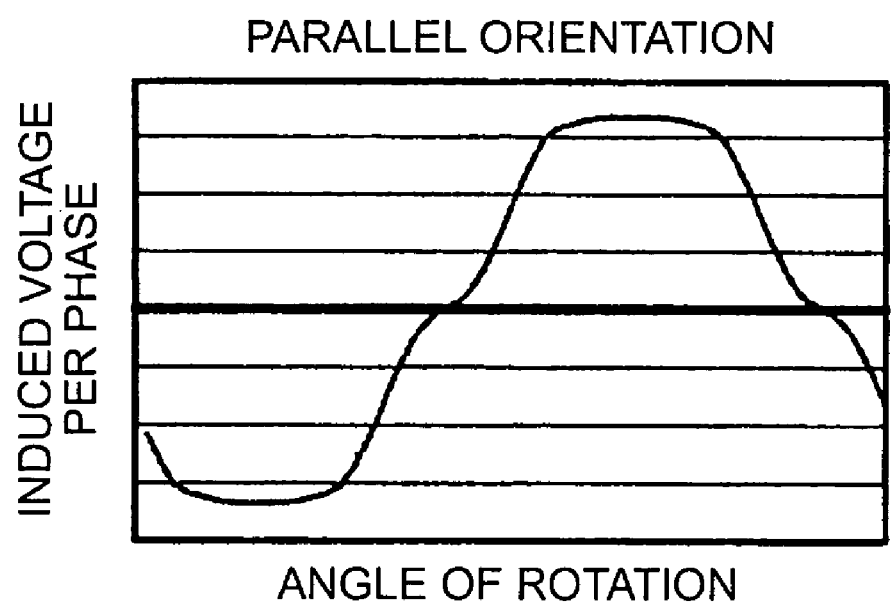
FIG. 9 is a characteristic view showing the relation between the angle of rotation of a rotor and an induced voltage per phase in the magnet of FIG. 8.

Similarly, a characteristic view of a brushless motor using a magnet 5B of parallel orientation (i.e., magnetic field lines directed toward a stator being parallel with one another), as shown in FIG. 8, was obtained. FIG. 9 is the characteristic view obtained at that time.

Figure 10:
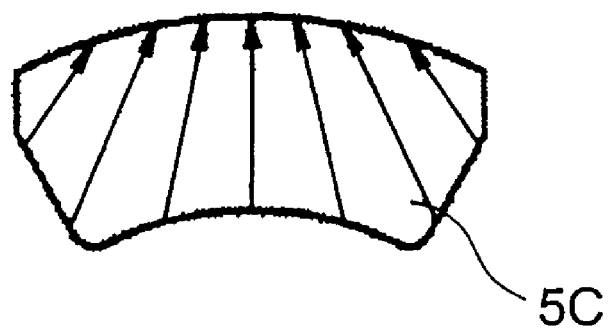
FIG. 10 is a front elevational view showing a magnet of reverse radial orientation.
Figure 11:
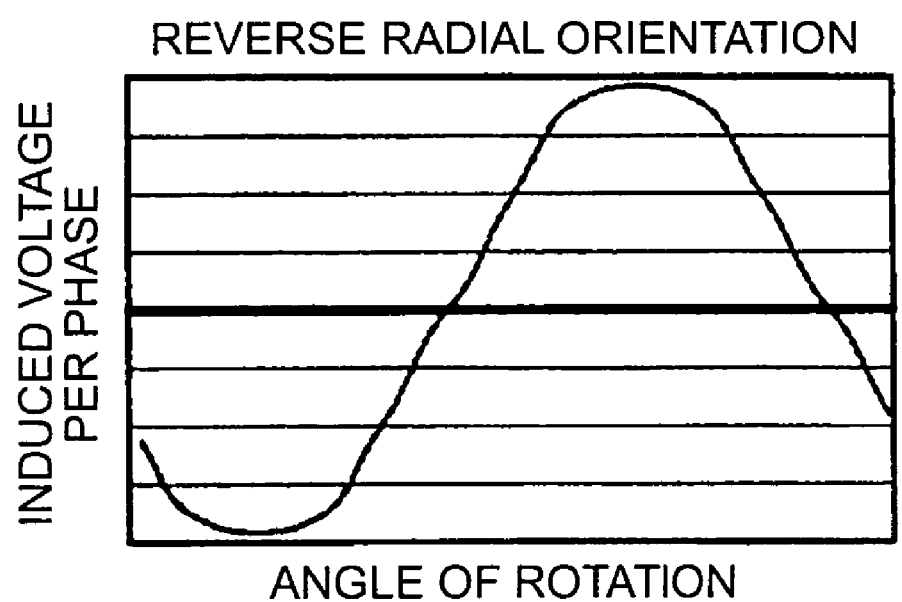
FIG. 11 is a characteristic view showing the relation between the angle of rotation of a rotor and an induced voltage per phase in the magnet of FIG. 10.

Further, a characteristic view of a brushless motor using a magnet 5C of reverse radial orientation that has no notched portions at its opposite ends, as shown in FIG. 10, was obtained. FIG. 11 is the characteristic view obtained at that time.

From the characteristic views of FIGS. 7, 9 and 11, it can be seen that the induced voltage per phase is greater when the magnet 5B of parallel orientation was used than when the magnet 5A of a radial orientation was used, and that the induced voltage per phase is greater when the magnet 5C of reverse radial orientation was used than when the magnet 5B of parallel orientation was used.

This is because the magnetic flux density in the gap between the stator 4 and the rotor 6 is higher in the case of the magnet 5C of reverse radial orientation than in the case of the other magnets 5A, 5B. For the magnet 5C, the waveform of the induced voltage per phase was not a smooth curve, but a waveform of a curve much closer to a sine wave was obtained for in the case of the magnet 5 of reverse radial orientation having the notched portions 12 at its opposite ends.

Figure 12:
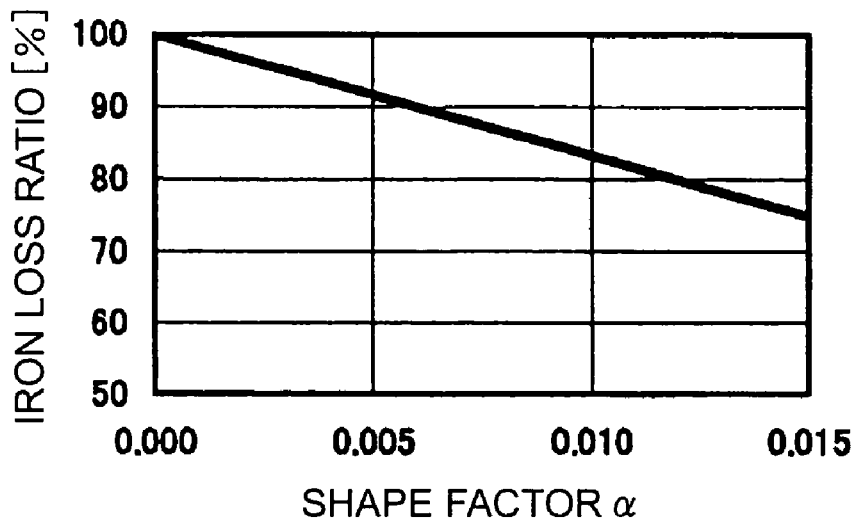
FIG. 12 is a characteristic view showing the relation between a shape factor $\alpha$ and an iron loss ratio in the brushless motor according to the first embodiment.

FIG. 12 is a characteristic view that shows the change of a iron loss ratio relative to the shape factor $\alpha$ in the brushless motor of this embodiment obtained through experiments with the shape factor $\alpha$ being taken on the axis of ordinate and the iron loss ratio being taken as the axis of abscissa. The iron loss ratio is set to 100% when $\alpha=0$, i.e., when the area S of each notched portion 12 is zero. From this figure, it can be understood that the greater the area S, the smaller does the iron loss become.

Figure 13:
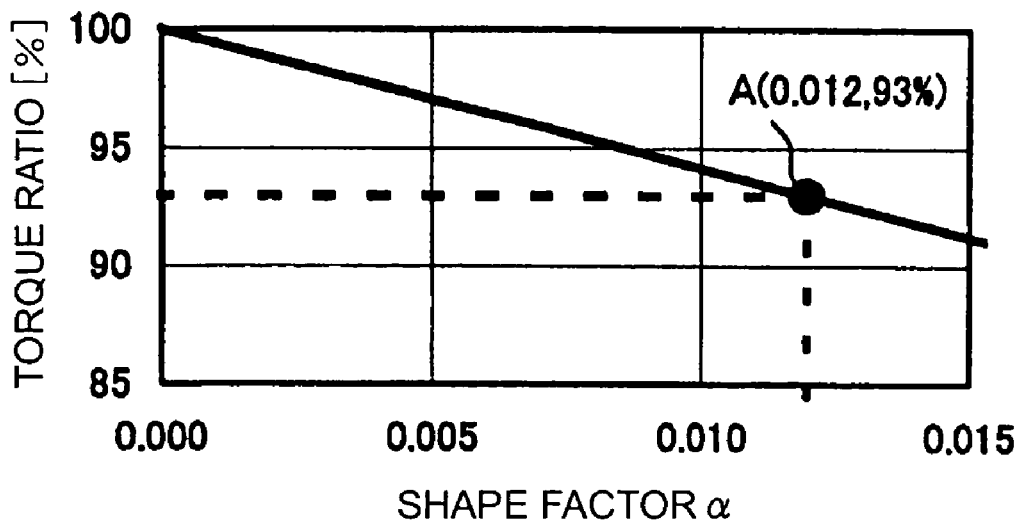
FIG. 13 is a characteristic view showing the relation between a shape factor $\alpha$ and a torque ratio in the brushless motor according to the first embodiment.

FIG. 13 is a characteristic view that shows the change of the torque ratio relative to $\alpha$ obtained through experiments with the shape factor $\alpha$ being taken as the axis of ordinate and the torque ratio being taken as the axis of abscissa. As can be seen from this figure, the output torque per current is set to 100% when $\alpha=0$, i.e., when the area S of each notched portion 12 is zero. According to this characteristic view, it will be understood that the output torque per current decreases as the area of each notched portion 12 is increased.

The higher the magnetic flux density in the gap between the stator 4 and the rotor 6, the greater does the motor output torque become, so the magnetic flux density becomes greater values in the order of the magnet 5A of radial orientation, the magnet 5B of parallel orientation, and the magnet 5 of reverse radial orientation.

The inventor found through experiments that when the torque ratio with a brushless motor including the magnet 5C of reverse radial orientation with 6 poles and 9 slots is set to 100%, the torque ratio of a brushless motor including the magnet 5B of parallel orientation with 6 poles and 9 slots is 93%.

Accordingly, it can be seen from the characteristic view of FIG. 13 that in order for the brushless motor of this embodiment to obtain a torque greater than that of the brushless motor including the magnet 5B of parallel orientation, it is necessary to set the shape factor $\alpha$ in the range of $\alpha\leqq 0.012$. In addition, when the shape factor $\alpha$ is 0, the area S of each notched portion 12 is 0, and hence to make S greater than zero, $\alpha$ is set to be greater than zero ($0<\alpha$)

According to the brushless motor of this embodiment, the magnetic flux density of each magnet 5 in the gap between the stator 4 and the rotor 6 is higher than that in other magnets 5A, 5B and hence an increase in iron loss becomes accordingly larger, but as can be seen from the characteristic view of FIG. 5, provision of the notched portions 12 for each magnet 5 serves to bring the voltage per phase induced in the brushless motor with respect to the angle of rotation of the rotor 6 into a curve close to a sine wave, whereby the increase of iron loss can be suppressed, thus making it possible to ensure a high induced voltage per phase.

Moreover, the induced voltage is a curve near the sine wave, so a steep change in the magnetic flux is suppressed, thus providing a large effect on the reduction of cogging torque and hence the reduction of noise.

Further, each magnet 5 is notched or cut away at opposite ends of the outer peripheral surface thereof, so the volume of each magnet 5 can be accordingly reduced, and hence the manufacturing cost is accordingly reduced, too.

Furthermore, when the shape factor $\alpha$ is in the range of $0<\alpha\leqq 0.012$, an output torque per current of the brushless motor of this embodiment is ensured which is greater than that with the brushless motor 6 having the magnets 5B of parallel orientation with 6 poles and 11 slots.

Here, note that when the shape factor $\alpha$ is close to zero within the range of $0<\alpha\leqq 0.012$, the torque per current becomes large and hence it is suitable for a brushless motor in which high torque is in the actual use range, whereas when the shape factor $\alpha$ is close to 0.012, the induced voltage has a waveform accordingly close to a sine wave and the iron loss ratio is small, so it is suitable for a brushless motor in which high rotational speed is in the actual use range.

Accordingly, when the brushless motor of this embodiment is applied to an electrohydraulic power steering apparatus which is constantly driven even during non-steering operation, there is provided the following advantages. That is, it becomes possible to decrease the maximum current at high torque corresponding to during stationary steering, so the load on the battery can be reduced, and at the same time the amount of current consumed during non-steering operation in which the brushless motor is constantly driven to operate at low torque can also be reduced due to the reduction of iron loss, thus making it possible to improve fuel mileage.

Embodiment 2

Figure 14:
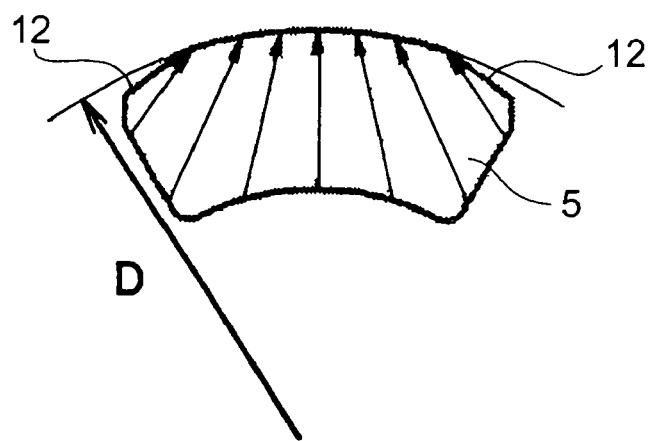
FIG. 14 is a front elevational view showing the magnetic field orientation of the magnet according to the second embodiment.
Figure 15:
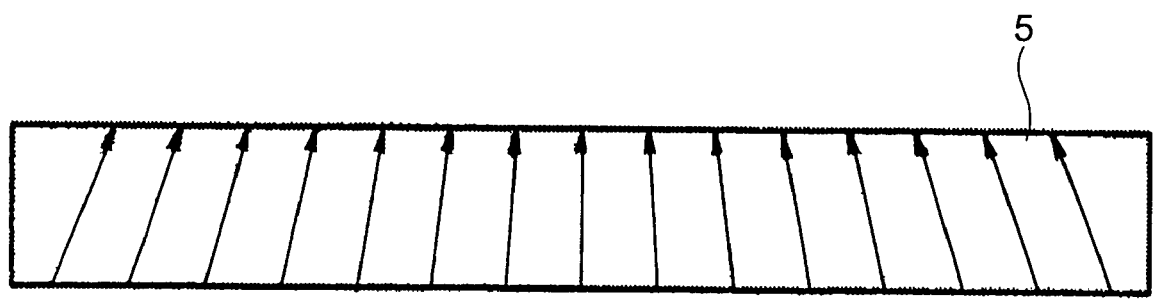
FIG. 15 is a cross sectional view when the magnet of FIG. 14 is cut along an axial direction.

FIG. 14 is a front elevational view that illustrates a magnet 5 according to a second embodiment of the present invention, and FIG. 15 is a cross sectional view when the magnet 5 of FIG. 14 is cut along an axial direction.

Similar to the above-mentioned first embodiment, this magnet 5 is magnetized in reverse radial orientation in such a manner that a magnetic field directed toward the stator 4 converges toward the stator 4, and the magnet 5 has a pair of notched portions 12 formed at opposite ends of the outer peripheral surface thereof. In addition, the magnet 5 is magnetized so that the magnetic field directed toward the stator 4 converges on an axially central side of the core 10 on a cross section taken along the axial direction (center orientation), as shown in FIG. 15.

In the brushless motor of this second embodiment, the same advantages as those of the first embodiment can be obtained, and besides, the magnetic field of the magnet 5 is arranged in center orientation, so the leakage flux to the stator 4 can be reduced, and the output torque can be accordingly improved.

While the invention has been described in terms of preferred embodiments, those skilled in the art will recognize that the invention can be practiced with modifications within the spirit and scope of the appended claims.

What is claimed is:

1. A brushless motor comprising:
   a stator having a core with slots formed therein and coils disposed in said slots, respectively, of said core; and
   a rotor having a plurality of segment type magnets disposed inside said stator so as to face said stator;
   wherein said magnets are magnetized in reverse radial orientation with respect to said rotor in such a manner that magnetic fields directed toward said stator converge toward said stator, and each of said magnets is provided at opposite ends of an outer peripheral surface of said magnets with a pair of notched portions so that a width of said magnets in a radial direction of said rotor gradually decreases toward said opposite end; and
   wherein an area of each of said pair of notched portions is expressed as follows:

$$S = (D^2/P) \times \alpha$$

where D is the diametral dimension of said intermediate portion of said outer peripheral surface of each of said magnets; P is the number of pole pairs; and $\alpha$ is a shape factor and is in the range of $0 < \alpha \leq 0.012$.

2. The brushless motor as set forth in claim 1, wherein said magnets are magnetized in such a manner that said reverse radial orientation converges on an axially central side of said core on a cross section taken along the axial direction.

3. The brushless motor as set forth in claim 1, wherein said brushless motor comprises a motor for use with an electrohydraulic power steering apparatus.

* * * * *